United States Patent
Robel et al.

(10) Patent No.: US 11,391,223 B2
(45) Date of Patent: Jul. 19, 2022

(54) INCREASING BRAKING POWER AND EXHAUST GAS TEMPERATURE

(71) Applicant: Caterpillar Inc., Peoria, IL (US)

(72) Inventors: Wade James Robel, Dunlap, IL (US); Spencer Landon Huhn, Chillicothe, IL (US); Kevin Weiss, Peoria, IL (US); John Robert McDonald, Peoria, IL (US); Jason Kenneth Bloms, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 31 days.

(21) Appl. No.: 16/947,826

(22) Filed: Aug. 19, 2020

(65) Prior Publication Data

US 2022/0056854 A1    Feb. 24, 2022

(51) Int. Cl.
| | |
|---|---|
| F02D 9/00 | (2006.01) |
| F02D 9/02 | (2006.01) |
| F02B 37/24 | (2006.01) |
| F02D 41/00 | (2006.01) |
| F02D 41/14 | (2006.01) |

(52) U.S. Cl.
CPC ............... F02D 9/02 (2013.01); F02B 37/24 (2013.01); F02D 41/0005 (2013.01); F02D 41/0007 (2013.01); F02D 41/1446 (2013.01); F02D 2009/0222 (2013.01); F02D 2009/0242 (2013.01)

(58) Field of Classification Search
CPC .... F02D 9/02; F02D 41/0005; F02D 41/0007; F02D 41/1446; F02D 2009/0222; F02D 2009/0242; F02B 37/24
See application file for complete search history.

(56) References Cited

U.S. PATENT DOCUMENTS 6,314,735 B1 * 11/2001 Kolmanovsky ....... F02D 41/024
                                                                60/602
6,681,573 B2 * 1/2004 Arnold .................... F02B 37/24
                                                                60/602

(Continued)

FOREIGN PATENT DOCUMENTS

| CN | 103233809 A | 8/2013 |
| GB | 2562298 A | 11/2018 |

OTHER PUBLICATIONS

Co-Pending U.S. Appl. No. 16/562,193, entitled "Using a Variable Geometry Turbocharger to Control an Exhaust Gas Temperature and a Pressure of an Intake Manifold," by Were et al., filed Sep. 5, 2019, 31 Pages.

(Continued)

*Primary Examiner* — Phutthiwat Wongwian
*Assistant Examiner* — Sherman D Manley
(74) *Attorney, Agent, or Firm* — Bookoff McAndrews PLLC

(57) ABSTRACT

A controller may identify an indication to initiate an engine braking procedure associated with an engine of a machine. The controller may obtain, based on identifying the indication to initiate the engine braking procedure, information relating to a requested amount of engine braking power of the engine. The controller may cause one or more components of a variable geometry turbocharger (VGT) of the engine to adjust, and a throttle valve of the engine to adjust, based on the information relating to the requested amount of engine braking power of the engine.

20 Claims, 4 Drawing Sheets

(56) References Cited

U.S. PATENT DOCUMENTS

| | | | |
|---|---|---|---|
| 6,725,660 B2 * | 4/2004 | Hidaka | F02B 37/24 |
| | | | 60/602 |
| 6,866,017 B2 * | 3/2005 | Ruggiero | F01L 13/06 |
| | | | 123/90.15 |
| 7,347,048 B2 | 3/2008 | Albat | |
| 8,631,643 B2 | 1/2014 | Farman et al. | |
| 9,032,941 B2 | 5/2015 | Dean et al. | |
| 2004/0016232 A1 * | 1/2004 | Warner | F02D 13/04 |
| | | | 123/321 |
| 2011/0146245 A1 | 6/2011 | Farman et al. | |
| 2011/0146246 A1 | 6/2011 | Farman et al. | |
| 2013/0146374 A1 * | 6/2013 | Books | B60L 7/18 |
| | | | 180/65.21 |
| 2013/0213350 A1 * | 8/2013 | Watanabe | F02B 39/10 |
| | | | 123/327 |
| 2014/0214308 A1 * | 7/2014 | Mulloy | F02D 13/04 |
| | | | 701/110 |
| 2014/0244116 A1 * | 8/2014 | Andrasko | B60W 30/18136 |
| | | | 701/48 |
| 2016/0061128 A1 | 3/2016 | Nicholson et al. | |
| 2020/0200103 A1 | 6/2020 | Mohlin | |

OTHER PUBLICATIONS

Written Opinion and International Search Report for Int'l Patent Appln. No PCT/US2021/043715, dated Nov. 15, 2021 (15 pgs).

* cited by examiner

INCREASING BRAKING POWER AND EXHAUST GAS TEMPERATURE

GOVERNMENT LICENSE RIGHTS

This invention was made with government support under the terms of an Assistance Agreement with Award No. DE-EE0008476 awarded by the U.S. Department of Energy. The government has certain rights in the invention.

TECHNICAL FIELD

The present disclosure relates generally to increasing braking power and exhaust gas temperature, and, more particularly, to using a variable geometry turbocharger and/or a throttle valve to increase braking power and exhaust gas temperature.

BACKGROUND

Internal combustion engines, such as diesel engines, produce exhaust gas that contains a variety of pollutants. These pollutants may include, for example, particulate matter (e.g., soot), nitrogen oxides (NOx), and sulfur compounds. In some cases, an engine may be associated with an exhaust aftertreatment system that reduces pollutants in exhaust gas prior to the release of the exhaust gas into the atmosphere.

Machines, such as vehicles, may operate an internal combustion engine (e.g., a diesel engine) to provide engine braking, such as exhaust braking or compression braking. For example, a machine may use engine braking during downhill operation of the machine to reduce wear to wheel brakes of the machine. However, engine braking may only provide a limited amount of braking power, so wheel brakes may still need to be employed in some cases.

During an engine braking procedure, gas in cylinders of the engine may be released to an exhaust system of the engine. Accordingly, energy stored in the released gas is not returned to the engine, and the released gas may have a relatively lower temperature when passing through an aftertreatment system of the exhaust system. As a result, temperature-dependent operations of the aftertreatment system may operate poorly during engine braking, thereby necessitating use of additional systems to heat the gas and/or the aftertreatment system.

U.S. Pat. No. 9,032,941 (the '941 patent) discloses improving a rate at which an exhaust stream temperature achieves a desirable operating temperature as well as aftertreatment conversion efficiency during an engine warm-up period. Per the '941 patent, when an engine operating temperature is less than a first predetermined internal exhaust gas recirculation (IEGR) threshold, a first IEGR mode is activated. When the engine operating temperature is greater than the first predetermined IEGR threshold, the first IEGR mode is deactivated, and a second IEGR mode is activated. The first mode may be tailored to provide for diesel oxidation catalyst (DOC) heating and/or cold start combustion stability, while a second mode is tailored for selective catalytic reduction (SCR) heating. According to the '941 patent, this may be useful for improving emissions where IEGR is used during exhaust warm-up following a cold start.

While the '941 patent is directed to providing a method for activating and deactivating different IEGR modes to affect an exhaust stream temperature, the method is only applicable during an engine warm-up period. Furthermore, the '941 patent does not disclose adjusting a variable geometry turbocharger and/or a throttle valve to control the exhaust stream temperature or any other parameter associated with operation of the engine.

Accordingly, the system of the present disclosure solves one or more of the problems set forth above and/or other problems in the art.

SUMMARY

In some implementations, a method includes identifying, by a controller, an indication to initiate an engine braking procedure associated with an engine of a machine; obtaining, by the controller and based on identifying the indication to initiate the engine braking procedure, information relating to a requested amount of engine braking power of the engine; and causing, by the controller, one or more components of a variable geometry turbocharger (VGT) of the engine to adjust, and a throttle valve of the engine to adjust, based on the information relating to the requested amount of engine braking power of the engine.

In some implementations, a controller includes one or more memories and one or more processors, communicatively coupled to the one or more memories, configured to: identify an indication to initiate an engine braking procedure associated with a machine; determine, after identifying the engine braking procedure, an exhaust gas temperature associated with the machine; determine, after identifying the engine braking procedure, a requested amount of engine braking power; and cause one or more components of a VGT to adjust and a throttle valve to adjust based on at least one of: the exhaust gas temperature, or the requested amount of engine braking power.

In some implementations, a system comprises: an engine; a VGT that includes adjustable vanes; a throttle valve; a sensor system; and a controller configured to: receive, from the sensor system, an indication to initiate an engine braking procedure associated with the engine; receive, from the sensor system and after receiving the indication to initiate the engine braking procedure, information concerning an exhaust gas temperature of the engine and information concerning a requested amount of engine braking power of the engine; and cause the adjustable vanes of the VGT to adjust and the throttle valve to adjust based on at least one of: the information concerning the exhaust gas temperature; or the information concerning the requested amount of engine braking power.

DETAILED DESCRIPTION

This disclosure relates to a controller, such as an engine control module (ECM), controlling a variable geometry turbocharger (VGT) of an engine and/or a throttle valve to control an amount of braking power and/or to control an exhaust gas temperature (e.g., of an exhaust gas produced by the engine). The controller, VGT, and/or throttle valve, as described herein, have universal applicability to any machine utilizing such a controller, VGT, and/or throttle valve. The term "machine" may refer to any machine that performs an operation associated with an industry such as, for example, mining, construction, farming, transportation, or any other industry. As some examples, the machine may be a vehicle, an off-highway truck, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, aerial equipment, or marine equipment.

Figure 1:
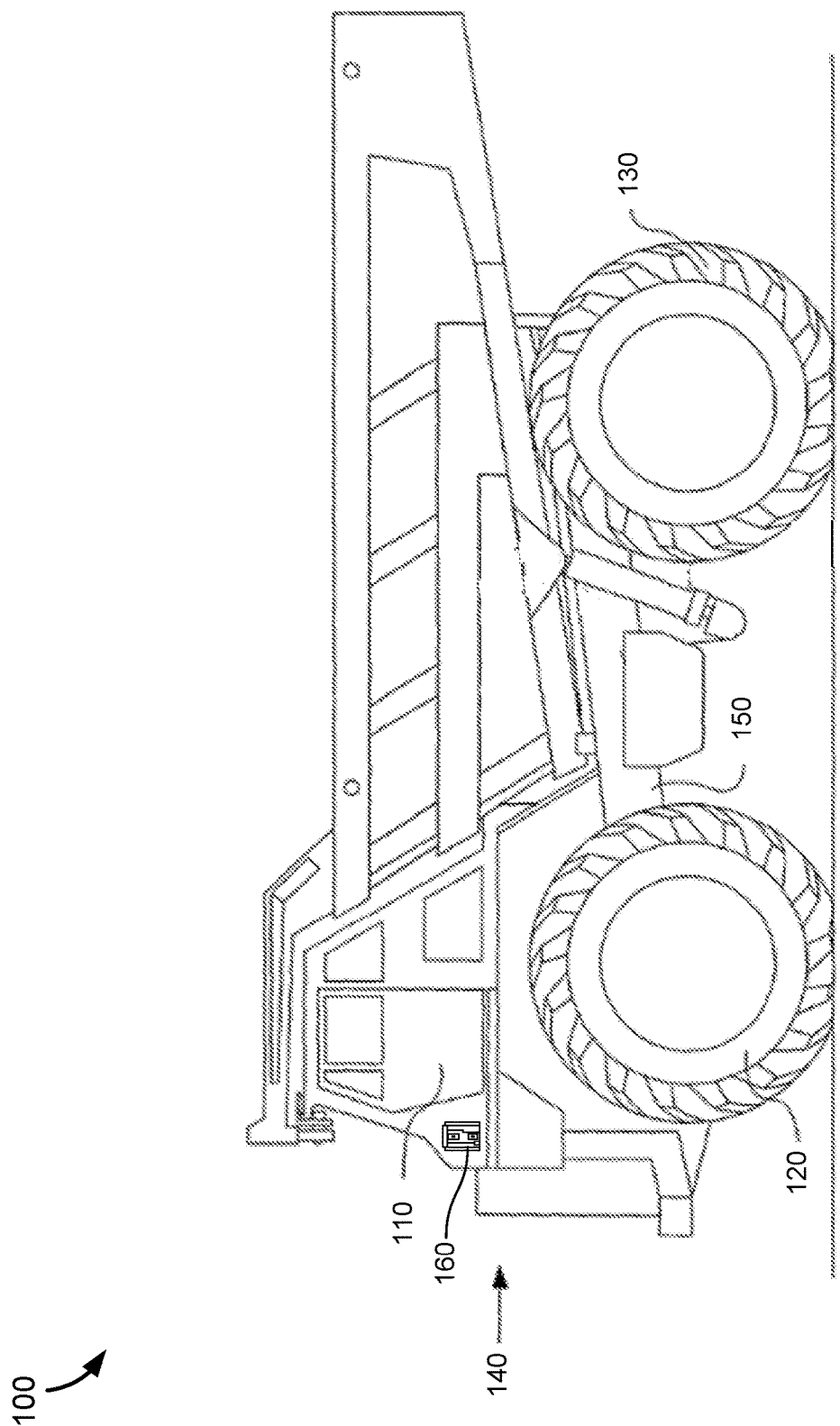
FIG. 1 is diagram of an example machine described herein.

FIG. 1 is a diagram of an example machine 100 described herein. For example, machine 100 may include a mobile machine, such as the off-highway truck shown in FIG. 1, or any other type of mobile machine. Machine 100 may include an operator cab 110, a plurality of front wheels 120, and a plurality of rear wheels 130. An engine compartment 140 may be mounted at one end of a frame 150 and may house an engine system (not shown in FIG. 1) operatively connected to provide power to drive the plurality of front wheels 120 and/or the plurality of rear wheels 130. A controller 160 (e.g., an ECM) may be included in the engine system and/or may be connected to one or more components of machine 100. Controller 160 may perform operations related to controlling a VGT and/or a throttle valve to control an amount of braking power of machine 100 and/or to control an exhaust gas temperature of machine 100, as described in more detail elsewhere herein.

As indicated above, FIG. 1 is provided as an example. Other examples may differ from what is described in connection with FIG. 1.

Figure 2:
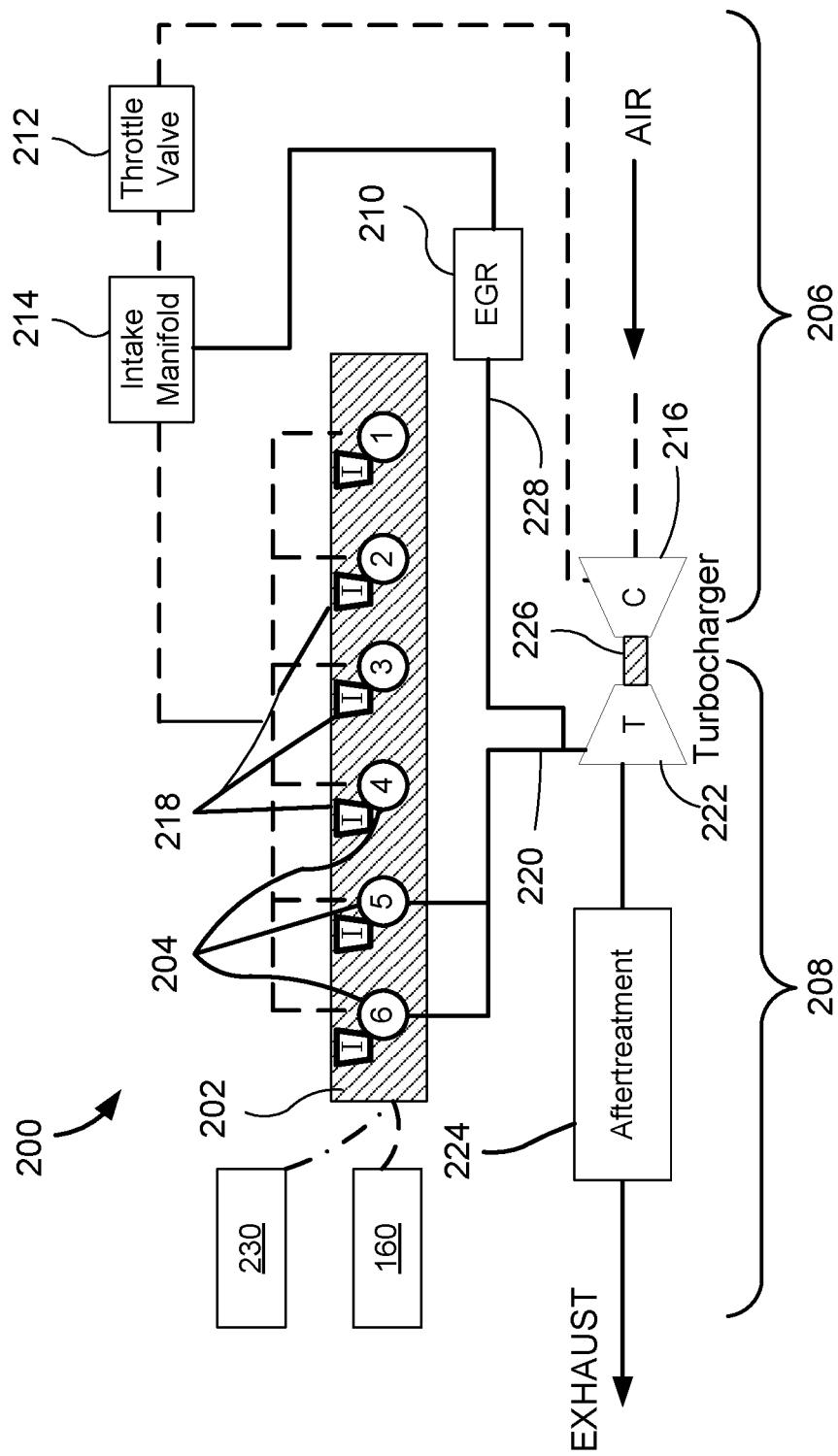
FIG. 2 is a diagram of an example engine system described herein.

FIG. 2 is a diagram of an example engine system 200 described herein. The engine system 200 may be housed in the engine compartment 140. The engine system 200 may include a compression ignition, internal combustion engine. However, the engine system 200 may include any other type of internal combustion engine, such as, for example, a spark ignition engine, a laser ignition engine, a plasma ignition engine, and/or the like. The engine system 200 may be fueled by such fuels as distillate diesel fuel, biodiesel, dimethyl ether, gaseous fuels, such as hydrogen, natural gas, and propane, alcohol, ethanol, and/or any combination thereof.

Engine system 200, of FIG. 2, may include an engine block 202 with a plurality of cylinders 204 (engine block 202 of FIG. 2 is shown with six cylinders 204, labeled 1-6). A piston assembly may be included within each of cylinders 204 to form a combustion chamber within each cylinder 204. Engine system 200 may include any number of combustion chambers, and the combustion chambers may be disposed in an in-line configuration, a "V" configuration, or in any other suitable configuration. Furthermore, the engine system 200 may consume one or more consumable resources (e.g., a fuel, such as gasoline, diesel fuel, and/or the like; a diesel exhaust fluid (DEF); one or more coolants; one or more lubricants, such as an oil, a grease, and/or the like; and/or the like) during operation (e.g., due to combustion in the engine block 202).

Engine system 200 may include multiple systems. For example, as shown in the example of FIG. 2, engine system 200 may include an air intake or air induction system 206, an exhaust system 208, and/or an exhaust gas recirculation (EGR) system 210. Air induction system 206 may be configured to direct air, or an air and fuel mixture (e.g., of air and another gas, such as exhaust gas) into engine system 200 for subsequent combustion. Exhaust system 208 may exhaust or release byproducts of the combustion to an atmosphere external to engine system 200. A recirculation loop of the EGR system 210 may be configured to direct a portion of the exhaust gases from exhaust system 208 back into air induction system 206 for subsequent combustion.

Air induction system 206 may include multiple components that cooperate to condition and introduce compressed air into cylinders 204. For example, air induction system 206 may include a throttle valve 212 and/or an intake manifold 214 located downstream of one or more compressors 216. The throttle valve 212 may selectively regulate (e.g., restrict) a flow of air into intake manifold 214. Intake manifold 214 may mix air and exhaust gas to create an air and exhaust gas mixture that is directed to the plurality of cylinders 204. The air induction system 206 feeds variable valve actuators 218 associated with respective ones of cylinders 204. Air induction system 206 may include an air cooler, a filtering component, a compressor bypass component, and/or the like.

Exhaust system 208 may include multiple components that cooperate to condition and direct exhaust gas from cylinders 204 to the atmosphere. For example, exhaust system 208 may include an exhaust passageway 220, one or more turbines 222 driven by exhaust gas flowing through exhaust passageway 220, and/or an exhaust aftertreatment device 224 (e.g., a diesel particulate filter (DPF), an aftertreatment selective catalytic reduction (SCR) device, and/or the like) located downstream of turbine 222. Exhaust system 208 may include one or more bypass components, an exhaust compression or restriction brake, an attenuation device, additional exhaust treatment devices, and/or the like.

Turbine 222 may be located to receive exhaust gas leaving engine system 200 and may be connected to the one or more compressors 216 of air induction system 206 by way of a common shaft 226. As exhaust gas exiting engine system 200 flows through turbine 222 and expands against vanes thereof, and turbine 222 may rotate and drive the one or more compressors 216 to pressurize inlet air.

In some implementations, the one or more compressors 216, common shaft 226, and turbine 222 may form a turbocharger, such as a variable geometry turbocharger (VGT). Turbine 222 (hereinafter referred to as "VGT turbine 222") may include one or more adjustable vanes such that a distance between the one or more adjustable vanes may be changed to alter a performance of the VGT. For example, the one or more adjustable vanes of VGT turbine 222 may be extended to a "closed" position or may be retracted to an "open" position, which may cause more or less air and/or exhaust gas from exhaust system 208 to enter into air induction system 206.

Exhaust aftertreatment device 224 may include one or more aftertreatment components for processing exhaust gas. For example, exhaust aftertreatment device 224 may include a DPF, an SCR device, a lean NOx trap (LNT), a diesel oxidation catalyst (DOC), an ammonia oxidation catalyst (AMOX), a heat source for regeneration of the DPF, and/or the like. Some operations performed by exhaust aftertreatment device 224 may be temperature-dependent. For example, some operations performed by exhaust aftertreatment device 224 may operate at a temperature that is greater than an atmospheric temperature. One such example is regeneration of a DPF, which may operate at a temperature greater than 150° C., 200° C., 250° C., and/or the like. Another example is NOx SCR, which may operate at a temperature greater than 175° C., 200° C., and/or the like.

EGR system 210 may redirect gases from exhaust system 208 back into air induction system 206 for subsequent combustion. When utilizing EGR in a VGT diesel engine, as shown in FIG. 2, the exhaust gas to be recirculated may be removed upstream of the exhaust gas driven VGT turbine 222. For example, in many EGR applications, the exhaust gas may be diverted from the exhaust passageway 220 via an EGR conduit 228 to air induction system 206. Likewise, the recirculated exhaust gas may be re-introduced to the air induction system 206 downstream of the compressor 216.

Engine system 200 of FIG. 2 includes controller 160. Controller 160, as described herein, provides control of engine system 200 and/or components of engine system 200. Controller 160 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. Controller 160 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by controller 160. Controller 160 may include a memory (e.g., a non-transitory computer-readable medium) capable of storing instructions, that when executed, cause the processor to perform one or more processes and/or methods described herein.

Sensor system 230 may provide measurements associated with various parameters used by controller 160 to control engine system 200 and/or components of engine system 200. Sensor system 230 may include physical sensors and/or any appropriate type of control system that generates values of sensing parameters based on a computational model and/or one or more measured parameters. As used herein, "sensing parameters" may refer to those measurement parameters that are directly measured and/or estimated by one or more sensors (e.g., physical sensors, virtual sensors, and/or the like). Example sensors may include temperature sensors (e.g., to measure a temperature of exhaust gas at VGT turbine 222, exhaust aftertreatment device 224, and/or the like), speed sensors (e.g., to measure a speed of the engine system 200 in revolutions per minute (RPM); a speed of VGT turbine 222 in RPM; a speed of machine 100 in kilometers per hour, miles per hour, and/or the like; and/or the like), chemical composition sensors (e.g., to measure an amount of carbon dioxide ($CO_2$), carbon oxide (CO), hydrocarbon (HC), NOx, and/or the like in exhaust gas), pressure sensors (e.g., to measure a pressure of the intake manifold 214 (e.g., an internal pressure of the intake manifold 214 in terms of kilopascals (kPa)), engine airflow sensors (e.g., to measure an engine airflow rate in terms of cubic meters per minute, cubic feet per minute, and/or the like), engine braking sensors (e.g., to measure a requested amount of engine braking power), and/or the like. Sensing parameters may also include any output parameters that may be measured indirectly by physical sensors and/or calculated based on readings of physical sensors.

Sensor system 230 may be configured to coincide with controller 160, may be configured as a separate control system, and/or may be configured as a part of other control systems. Further, controller 160 may implement sensor system 230 by using computer software, hardware, or a combination of software and hardware.

As indicated above, FIG. 2 is provided as an example. Other examples may differ from what is described in connection with FIG. 2.

Figure 3:
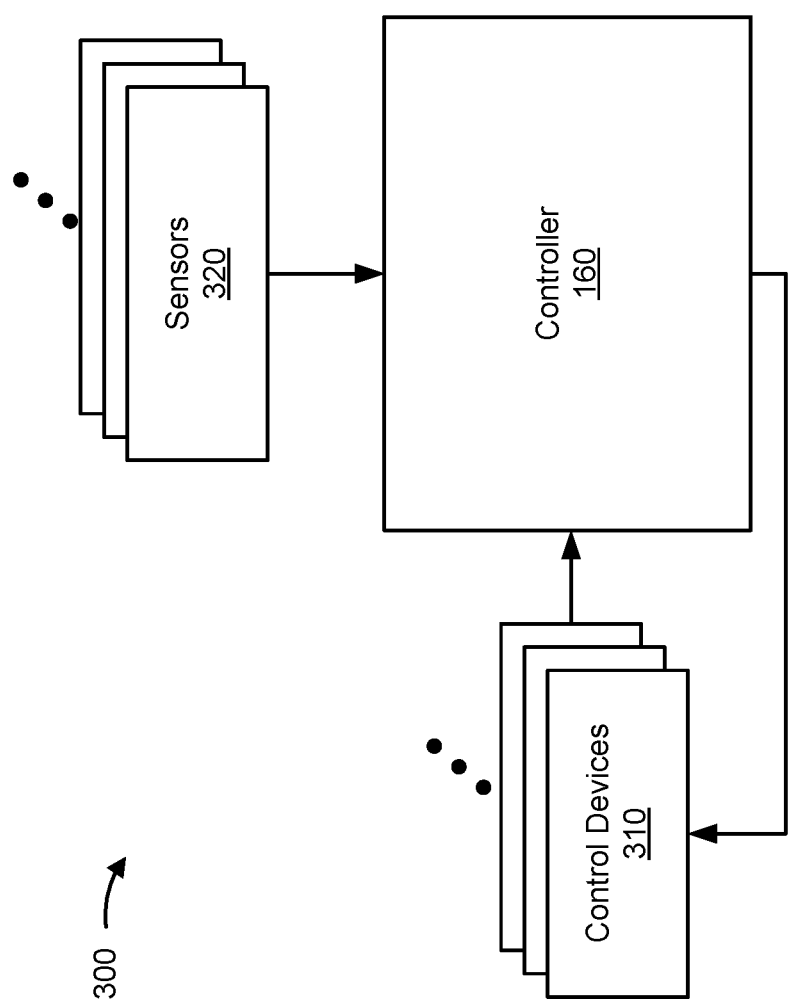
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more control devices 310 (referred to individually as "control device 310" and collectively as "control devices 310") and one or more sensors 320 (referred to individually as "sensor 320" and collectively as "sensors 320") and controller 160. Devices and/or components of environment 300 may interconnect via wired connections, wireless connections, or a combination of wired and wireless connections.

Control device 310 may be any type of device that may be used by controller 160 to control a performance feature of engine system 200. For example, control device 310 may include one or more actuators, switches, and/or the like that are capable of controlling a component of engine system 200. Control device 310 may be capable of causing adjustment of one or more components of the VGT, such as adjustable vanes of VGT turbine 222 (e.g., from a first vane position to a second vane position), causing adjustment of throttle valve 212 (e.g., from a first valve position to a second valve position), and/or the like.

Sensors 320 may include any type of sensor configured to measure operating conditions of engine system 200. Sensors 320 may be sensors of sensor system 230, as described herein. For example, the sensors 320 may include temperature sensors (e.g., to detect temperature of air, exhaust gas, a component, coolant, and/or the like), position sensors (e.g., to detect a position of a valve (e.g., throttle valve 212), an actuator, an engine part (e.g., a piston), a vane position of the adjustable vanes of the VGT, and/or the like), speed sensors (e.g., to detect an engine speed, a machine speed, a turbocharger speed (e.g., a VGT speed), and/or the like), pressure sensors (e.g., to detect a measure of compression of air or exhaust gas in a component of engine system 200 (e.g., in intake manifold 214), emissions sensors (e.g., to detect engine emission levels), load sensors (e.g., to detect an engine load), engine fuel sensors (e.g., to detect an amount of fuel for the engine), engine airflow sensors (e.g., to detect an engine airflow rate), braking sensors (e.g., to detect activation of a brake pedal, switch, and/or the like to reduce a speed of a machine (e.g., using engine braking)), and/or the like. In one example, sensors 320 may include one or more temperature sensors at (e.g., at an inlet, at an outlet, at an internal location, and/or the like of) VGT turbine 222 and/or exhaust aftertreatment device 224 to detect an exhaust gas temperature.

Controller 160 may include one or more devices configured to control one or more components of engine system 200. For example, controller 160 may be configured to control the VGT and/or throttle valve 212 of engine system 200, to control an amount of braking power of machine 100 and/or an exhaust gas temperature. Controller 160 may control the one or more components of engine system 200 by sending one or more commands to control device 310.

Controller 160 may obtain information concerning engine system 200 from sensors 320 (e.g., directly from sensors 320 or via one or more other components or devices of engine system 200, such as a different controller). For example, controller 160 may obtain information indicating that an engine braking procedure (e.g., an exhaust braking procedure, a compression braking procedure, and/or the like) is to be initiated (e.g., based on an operator of machine 100 interacting with a brake pedal, switch, and/or the like of operator cab 110). As another example, controller 160 may obtain information concerning an exhaust gas temperature (e.g., a temperature of the exhaust gas at VGT turbine 222 and/or exhaust aftertreatment device 224), information concerning a requested amount of engine braking power to reduce a speed of machine 100 (e.g., an indication that engine braking is to be applied at the requested amount of engine braking power to reduce the speed of machine 100). Additionally, or alternatively, controller 160 may obtain information concerning a position of throttle valve 212, information concerning a load of the engine, information concerning an engine fuel amount (e.g., an amount of fuel available to the engine), information concerning a position of adjustable vanes of the VGT of engine system 200, information concerning a speed of the VGT, information concerning a speed of the machine 100, and/or the like.

Controller 160 may process the information concerning engine system 200 to determine one or more parameters. For example, controller 160 may process (e.g., parse) the information indicating that an engine braking procedure is to be initiated to determine that an engine braking procedure is to be initiated. As another example, controller 160 (e.g., after determining that the engine braking procedure is to be initiated) may process the information concerning the exhaust gas temperature to determine the exhaust gas temperature and/or may process the information concerning the requested amount of engine braking power to determine the amount of engine braking power to reduce the speed of machine 100. In this way, controller 160 may process the information concerning engine system 200 to determine the speed of the engine, the exhaust gas temperature, the engine airflow rate, the pressure of intake manifold 214, the requested amount of engine braking power, the position of throttle valve 212, the load of the engine, the engine fuel amount, the position of the adjustable vanes of the VGT, the speed of the VGT, the speed of the machine 100, and/or the like.

Controller 160 may evaluate the one or more parameters. For example, controller 160 may determine whether to control one or more components of engine system 200 based on the requested amount of engine braking power. Controller 160 may determine an available amount of engine braking power (e.g., when an engine braking procedure is initiated) and may determine that the requested amount of engine braking power is greater than the available amount of engine braking power. Accordingly, controller 160 may control the VGT and/or throttle valve 212 to change the available amount of engine braking power. For example, controller 160 may cause one or more of the adjustable vanes of the VGT (e.g., of VGT turbine 222) to adjust (e.g., from a first vane position to a second vane position) and/or may cause throttle valve 212 to adjust (e.g., from a first valve position to a second valve position). This may change a flow of air in air induction system 206 and thereby intake manifold 214, which may change the pressure of intake manifold 214. This may cause the available amount of engine braking power to increase.

In some implementations, adjusting the adjustable vane of the VGT may cause a speed of the VGT (e.g., of the VGT turbine 222) to increase. Controller 160 may determine whether the speed of the VGT satisfies (e.g., is greater than or equal to) a threshold (e.g., a threshold above which the speed of the VGT reduces the available amount of engine braking power). When controller 160 determines that the speed of the VGT satisfies the threshold, controller 160 may cause throttle valve 212 to adjust (e.g., from a second valve position to a third valve position). This may counter a reduction in the amount of available engine braking power caused by the VGT speed satisfying the threshold. Accordingly, the available amount of engine braking power may stay the same or increase after throttle valve 212 is adjusted.

In some implementations, controller 160 may determine whether the exhaust gas temperature satisfies (e.g., is greater than or equal to) an exhaust gas temperature threshold. The exhaust gas temperature threshold may be a minimum operating temperature of exhaust aftertreatment device 224 (e.g., a minimum operating temperature for exhaust aftertreatment device 224 to operate in an efficient and/or effective manner to remove and/or convert particulate matter and/or other emissions in the exhaust gas). In some implementations, controller 160 may determine that the exhaust gas temperature satisfies the exhaust gas temperature threshold and may therefore determine to refrain from controlling any component of engine system 200 to change the exhaust gas temperature.

In some implementations, controller 160 may determine that the exhaust gas temperature fails to satisfy the exhaust gas temperature threshold and therefore may control the one or more components of engine system 200 to change the exhaust gas temperature. In some implementations, controller 160 may control the VGT of engine system 200. For example, controller 160 may cause one or more of the adjustable vanes of the VGT (e.g., of VGT turbine 222) to adjust from a first vane position to a second vane position (e.g., adjust from a closed vane position to an open vane position). This may restrict a flow of air in air induction system 206, which may cause the engine of engine system 200 to run rich and increase an operating temperature of the engine, and thereby increase the exhaust gas temperature (e.g., to a temperature greater than or equal to the minimum operating temperature for exhaust aftertreatment device 224).

Additionally, or alternatively, controller 160 may control throttle valve 212. For example, controller 160 may cause throttle valve 212 to adjust from a first valve position to a second valve position (e.g., adjust from an open valve position to a closed valve position). Similar to controlling the VGT, this may restrict the flow of air in air induction system 206, which may cause the engine of engine system 200 to run rich and increase the operating temperature of the engine, and thereby increase the exhaust gas temperature.

In some implementations, controller 160 may control the VGT to increase the exhaust gas temperature and may subsequently control throttle valve 212 to further increase the exhaust temperature. In an example, controller 160 may cause the adjustable vanes of the VGT to adjust based on the exhaust gas temperature, as described herein. After causing the adjustable vanes of the VGT to adjust, controller 160 may obtain additional information concerning the exhaust gas temperature (e.g., at a second time after a first time when controller 160 obtained the information concerning the exhaust gas temperature). Controller 160 may determine an updated exhaust gas temperature (e.g., a temperature of the exhaust gas at the second time) based on the additional information concerning the exhaust gas temperature, and may determine whether the updated exhaust gas temperature satisfies the exhaust gas temperature threshold.

Controller 160 may determine that the updated exhaust gas temperature satisfies the exhaust gas temperature threshold (e.g., the exhaust gas temperature is greater than or equal to a minimum operating temperature of exhaust aftertreatment device 224) and may determine to refrain from controlling any additional component of engine system 200 to change the exhaust gas temperature. Additionally, or alternatively, controller 160 may determine that the updated exhaust gas temperature fails to satisfy the exhaust gas temperature threshold, and may determine to control throttle valve 212 to change the exhaust gas temperature. In such a scenario, controller 160 may cause throttle valve 212 to adjust to increase the exhaust gas temperature, as described herein.

In this way, controller 160 may cause one or more of the adjustable vanes of the VGT (e.g., the adjustable vanes of VGT turbine 222) to adjust (e.g., from a first vane position to a second vane position) and/or may cause throttle valve 212 to adjust (e.g., from a first valve position to a second valve position) to cause the exhaust gas temperature to change and/or the pressure of intake manifold 214 to change.

While some implementations described herein concern controller 160 causing the adjustable vanes of the VGT to adjust before causing the throttle valve 212 to adjust, implementations also include controller 160 causing the throttle valve 212 to adjust before causing the adjustable vanes of the VGT to adjust to cause the exhaust gas temperature to change and/or the amount of engine braking power to change.

Additionally, or alternatively, while some implementations described herein concern controller 160 causing one or more of the adjustable vanes of the VGT to adjust (e.g., from a first vane position to a second position), implementations also include controller 160 causing one or more additional components of the VGT to adjust. For example, controller 160 may cause an adjustable intake or an adjustable outlet of VGT turbine 222 to adjust. As another example, controller 160 may cause an adjustable flow area control element of the VGT to adjust. Accordingly, the controller 160 may cause the one or more additional components of the VGT to adjust when causing (or instead of causing) the adjustable vanes of the VGT to adjust.

The number and arrangement of devices and networks shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
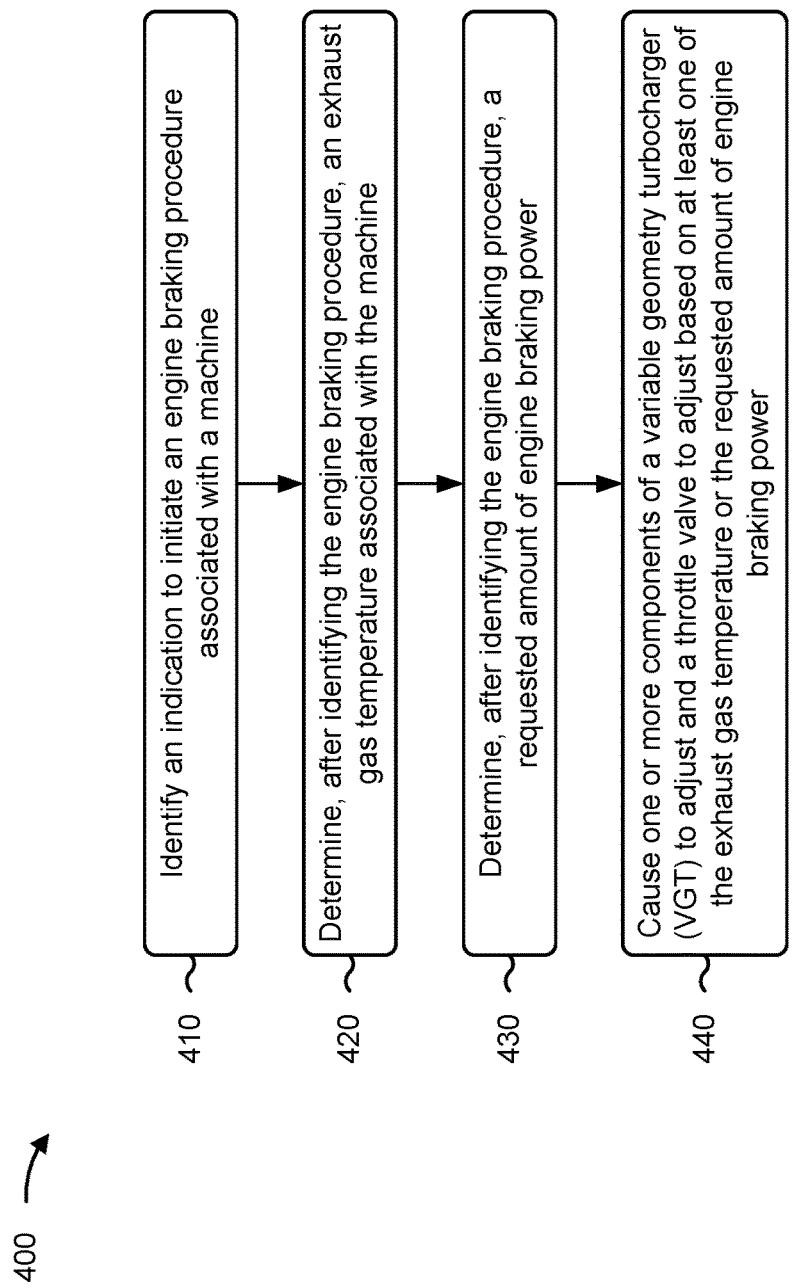
FIG. 4 is a flowchart of an example process for increasing braking power and exhaust gas temperature.

FIG. 4 is a flowchart of an example process 400 associated with increasing braking power and exhaust gas temperature. In some implementations, one or more process blocks of FIG. 4 may be performed by a controller (e.g., controller 160). In some implementations, one or more process blocks of FIG. 4 may be performed by another device or a group of devices separate from or including the controller, such as a control device (e.g., control device 310), a sensor (e.g., sensor 320), and/or the like.

As shown in FIG. 4, process 400 may include identifying an indication to initiate an engine braking procedure associated with a machine (block 410).

As further shown in FIG. 4, process 400 may include determining, after identifying the engine braking procedure, an exhaust gas temperature associated with the machine (block 420).

As further shown in FIG. 4, process 400 may include determining, after identifying the engine braking procedure, a requested amount of engine braking power (block 430).

As further shown in FIG. 4, process 400 may include causing one or more components of a VGT to adjust and a throttle valve to adjust based on at least one of the exhaust gas temperature or the requested amount of engine braking power (block 440). For example, the controller may determine that the exhaust gas temperature fails to satisfy an exhaust gas temperature threshold and may cause, based on determining that the exhaust gas temperature fails to satisfy the exhaust gas temperature threshold, at least one adjustable vane of the VGT to adjust from a first vane position to a second vane position, and the throttle valve to adjust from a first valve position to a second valve position. As another example, the controller may determine that an available amount of engine braking power of the machine is less than the requested amount of engine braking power and may cause, based on determining that the available amount of engine braking power is less than the requested amount of engine braking power, at least one adjustable vane of the VGT to adjust from a first vane position to a second vane position and the throttle valve to adjust from a first valve position to a second valve position.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The above-described techniques allow a controller 160 of an engine (e.g., associated with engine system 200) to control a VGT (e.g., comprising one or more compressors 216, common shaft 226, and VGT turbine 222) and/or a throttle valve 212 of the engine. In this way, the controller 160 may increase an amount of engine braking power. This may be particularly beneficial in situations when the engine cannot generate sufficient engine braking power using typical engine braking techniques, such as during downhill operations. Accordingly, this may reduce an amount of wear and tear on wheel brakes during these situations. Furthermore, the controller 160 may manage an exhaust gas temperature to allow an exhaust aftertreatment device 224 of the engine to remove and/or convert particulate matter and/or other emissions in the exhaust gas. This may be particularly beneficial in situations when the engine cannot generate sufficiently hot exhaust gas, such as during downhill operations.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   identifying, by a controller, an indication to initiate an engine braking procedure associated with an engine of a machine;
   obtaining, by the controller and based on identifying the indication to initiate the engine braking procedure, information relating to a requested amount of engine braking power of the engine; and
   causing, by the controller, one or more components of a variable geometry turbocharger (VGT) of the engine to adjust, and a throttle valve of the engine to adjust, based on the information relating to the requested amount of engine braking power of the engine and based on an exhaust gas temperature threshold that is associated with a minimum operating temperature of an exhaust aftertreatment device.

2. The method of claim 1, wherein causing the one or more components of the VGT to adjust and the throttle valve to adjust causes the engine braking power of the engine to increase.

3. The method of claim 1, further comprising:
   determining, after causing the one or more components of the VGT to adjust, that a speed of the VGT satisfies a threshold; and
   causing the throttle valve to adjust based on determining that the speed of the VGT satisfies the threshold.

4. The method of claim 1, wherein causing the one or more components of the VGT to adjust comprises:
   causing at least one adjustable vane of the VGT to adjust from a first vane position to a second vane position.

5. The method of claim 1, wherein causing the throttle valve to adjust comprises: causing the throttle valve to adjust from a first valve position to a second valve position.

6. The method of claim 1, wherein causing the one or more components of the VGT to adjust and the throttle valve to adjust comprises:
   determining, based on the information related to the requested amount of engine braking power, the requested amount of engine braking power;
   determining an available amount of engine braking power of the engine;
   determining that the requested amount of engine braking power is greater than the available amount of engine braking power; and
   causing, based on determining that the requested amount of engine braking power is greater than the available amount of engine braking power, the one or more components of the VGT to adjust and the throttle valve to adjust to increase the available amount of engine braking power.

7. The method of claim 1, wherein causing the one or more components of the VGT to adjust and the throttle valve to adjust causes an exhaust gas temperature of the engine to increase.

8. The method of claim 1, wherein causing the one or more components of the VGT to adjust and the throttle valve to adjust causes a temperature of an exhaust aftertreatment device associated with the engine to increase above a target temperature.

9. A controller, comprising:
   one or more memories; and
   one or more processors, communicatively coupled to the one or more memories, configured to:
      identify an indication to initiate an engine braking procedure associated with a machine;
      determine, after identifying the engine braking procedure, an exhaust gas temperature associated with the machine;
      determine, after identifying the engine braking procedure, a requested amount of engine braking power; and
      cause one or more components of a variable geometry turbocharger (VGT) to adjust and a throttle valve to adjust based on the exhaust gas temperature.

10. The controller of claim 9, wherein the one or more processors, when causing the one or more components of the VGT to adjust and the throttle valve to adjust, are configured to:
    determine that the exhaust gas temperature fails to satisfy an exhaust gas temperature threshold;
    cause, based on determining that the exhaust gas temperature fails to satisfy the exhaust gas temperature threshold, at least one adjustable vane of the VGT to adjust from a first vane position to a second vane position; and
    cause, based on determining that the exhaust gas temperature fails to satisfy the exhaust gas temperature threshold, the throttle valve to adjust from a first valve position to a second valve position.

11. The controller of claim 9, wherein the one or more processors, when causing the one or more components of the VGT to adjust and the throttle valve to adjust, are configured to:
    determine that an available amount of engine braking power of the machine is less than the requested amount of engine braking power;
    cause, based on determining that the available amount of engine braking power is less than the requested amount of engine braking power, at least one adjustable vane of the VGT to adjust from a first vane position to a second vane position; and
    cause, based on determining that the available amount of engine braking power is less than the requested amount of engine braking power, the throttle valve to adjust from a first valve position to a second valve position.

12. The controller of claim 9, wherein causing the one or more components of the VGT to adjust and the throttle valve to adjust causes an engine braking power of the machine to increase and an exhaust gas temperature of the machine to increase.

13. The controller of claim 9, wherein the one or more processors, when causing the one or more components of the VGT to adjust and the throttle valve to adjust, are configured to:
    cause the one or more components of the VGT to adjust;
    determine, after causing the one or more components of the VGT to adjust, a speed of the VGT; and cause the throttle valve to adjust based on the speed of the VGT.

14. The controller of claim 9, wherein causing the one or more components of the VGT to adjust and the throttle valve to adjust increases a temperature of an exhaust aftertreatment device associated with the machine above a target temperature.

15. A system comprising: an engine;
a variable geometry turbocharger (VGT) that includes adjustable vanes; a throttle valve;
a sensor system; and
a controller configured to:
receive, from the sensor system, an indication to initiate an engine braking procedure associated with the engine;
receive, from the sensor system and after receiving the indication to initiate the engine braking procedure, information concerning an exhaust gas temperature of the engine and information concerning a requested amount of engine braking power of the engine; and
cause the adjustable vanes of the VGT to adjust and the throttle valve to adjust based on at least the information concerning the exhaust gas temperature in comparison to a predetermined exhaust gas temperature threshold.

16. The system of claim 15, wherein the engine braking procedure is an exhaust braking procedure or a compression braking procedure.

17. The system of claim 15, wherein the controller, when causing the adjustable vanes of the VGT to adjust or the throttle valve to adjust, is configured to:
cause the adjustable vanes of the VGT to adjust from a first vane position to a second vane position based on the information concerning the requested amount of engine braking power; and
cause the throttle valve to adjust from a first valve position to a second valve position based on the information concerning the exhaust gas temperature.

18. The system of claim 15, wherein the controller, when causing the adjustable vanes of the VGT to adjust or the throttle valve to adjust, is configured to:
cause the adjustable vanes of the VGT to adjust from a first vane position to a second vane position based on the information concerning the exhaust gas temperature; and
cause the throttle valve to adjust from a first valve position to a second valve position based on the information concerning the requested amount of engine braking power.

19. The system of claim 15, wherein causing the adjustable vanes of the VGT to adjust and the throttle valve to adjust causes the exhaust gas temperature to change or an amount of engine braking power associated with the engine to change.

20. The system of claim 15, wherein causing the adjustable vanes of the VGT to adjust and the throttle valve to adjust causes a temperature of an exhaust aftertreatment device associated with the engine to be above a target temperature.

* * * * *

UNITED STATES PATENT AND TRADEMARK OFFICE
CERTIFICATE OF CORRECTION

| | |
|---|---|
| PATENT NO. | : 11,391,223 B2 |
| APPLICATION NO. | : 16/947826 |
| DATED | : July 19, 2022 |
| INVENTOR(S) | : Wade James Robel |

It is certified that error appears in the above-identified patent and that said Letters Patent is hereby corrected as shown below:

In the Specification

Insert the following immediately after the title at Column 1:
--Statement of Government Interest
This invention was made with government support under contract DE-EE0008476 awarded by the DOE. The Government has certain rights in this invention.--

Signed and Sealed this
First Day of November, 2022

Katherine Kelly Vidal
Director of the United States Patent and Trademark Office